(12) United States Patent
Pitschel et al.

(10) Patent No.: US 8,494,123 B2
(45) Date of Patent: Jul. 23, 2013

(54) ON-HOLD VISUAL MENU FROM A USER'S COMMUNICATIONS DEVICE

(75) Inventors: Donald W. Pitschel, San Francisco, CA (US); Imran Chaudhri, San Francisco, CA (US); Freddy Anzures, San Francisco, CA (US); Marcel van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 13/175,257

(22) Filed: Jul. 1, 2011

(65) Prior Publication Data

US 2013/0003951 A1    Jan. 3, 2013

(51) Int. Cl.
*H04M 1/64*    (2006.01)
(52) U.S. Cl.
USPC ............... 379/88.11; 379/88.23; 709/211
(58) Field of Classification Search
USPC ......... 379/88.11, 88.17, 88.23, 162; 709/211, 709/219
See application file for complete search history.

(56) References Cited

U.S. PATENT DOCUMENTS

| | | | |
|---|---|---|---|
| 6,020,916 A | 2/2000 | Gerszberg et al. | |
| 6,400,804 B1 | 6/2002 | Bilder | |
| 7,151,827 B2 | 12/2006 | Scott et al. | |
| 7,209,475 B1* | 4/2007 | Shaffer et al. | 370/355 |
| 2002/0176559 A1 | 11/2002 | Adamek et al. | |
| 2004/0203660 A1 | 10/2004 | Tibrewal et al. | |
| 2005/0249345 A1 | 11/2005 | Burg et al. | |
| 2006/0198505 A1* | 9/2006 | Kortum et al. | 379/201.04 |
| 2007/0004384 A1* | 1/2007 | Anupam | 455/414.1 |
| 2007/0299939 A1* | 12/2007 | Johnston | 709/219 |
| 2008/0254773 A1 | 10/2008 | Lee | |
| 2008/0254774 A1 | 10/2008 | Lee | |

OTHER PUBLICATIONS

"Developmentality", Nick Dunn's thoughts on technology and programming, *Automated phone trees: two potential solutions*, Printed from Internet on Feb. 7, 2011: http://developmentality.wordpress.com/2009/07/, (Jul. 2009), pp. 1-5.
"Skymol™ Communicator Live Video Chat: Features and Screenshots", Printed from Internet on Nov. 8, 2010: http://skymolcorp.com/index.php?page=menu_801, pp. 3-6.
DECOGRAM, "iTunes Preview—Lucy Phone", *LucyPhone for iPhone, iPod touch, and iPad on the iTunes App Store*, Printed from Internet on Nov. 8, 2010: http://itunes.apple.com/us/app/lucyphone, (2010), pp. 1-3.
RADVISION, "A comprehensive solution for introducing video to existing contact centers and enhancing the visual experience of video contact centers", *RADVISION Video Solution for Contact Centers*, V 1.5, printed from Internet: http://www.vocalcom.com/download/VIDEO-SOLUTIONS-Radvision-Video-Solution-for-Contact-Centers.pdf, (Oct. 2005), pp. 1-13.

* cited by examiner

*Primary Examiner* — Creighton Smith
(74) *Attorney, Agent, or Firm* — Meyertons, Hood, Kivlin, Kowert & Goetzel, PC

(57) ABSTRACT

A user equipment communications device is configured to provide personal content to a party to a call with a user of the device, when the user places the party on hold. The device determines that the party has been placed on hold and that the user has enabled sharing of personal content with the party. The device then transmits a visual menu to a communications device of the party via a data network, to allow the party to select a type of personal content to receive from the device while the party is on hold. When the device receives a selection from the party's device indicating the type of personal content, it transmits a personal information asset to the party's device according to the type of personal content indicated by the selection. Other embodiments are also described and claimed.

26 Claims, 6 Drawing Sheets

ON-HOLD VISUAL MENU FROM A USER'S COMMUNICATIONS DEVICE

An embodiment of the invention relate to providing a visual menu from a user's communications device to a communications device of a party that is placed on hold during a call. Other embodiments are also described.

BACKGROUND

Communications systems (e.g., office private branch exchange systems) often present a party that is on hold during a call with information that is designed to fill the silence or occupy the party while on hold. For example, many telecommunications systems will play prerecorded music or other prerecorded audio as the "on-hold message." The music or prerecorded audio may be delivered over a voice only communication channel (e.g., the same voice channel used to support the call) from a central server or computer that is remote from the end devices of both the called party and the calling party. This generally constrains the amount of bandwidth that is available for presenting information to the on-hold party and also the types of information that can be provided. Providing limited entertainment to the on-hold party may result in the party abandoning the call or becoming irritated while waiting for the call to resume.

SUMMARY

In an embodiment of the invention, a communications device of a user that places a party on hold during a call is configured to provide the on-hold party with interactive content via a data network, while the party remains on hold. In response to determining that the user has placed a party on hold and determining that the user has enabled sharing of personal content with the party, the user's device transmits a visual menu to the on-hold party's communications device over the data network. The visual menu will allow the on-hold party to select a type of content which her device can then receive from the user's device, while the party is on hold. In response to receiving a selection from the on-hold party's communications device, the user's device transmits a personal information asset to the on-hold party's device over the data network, the personal information asset is of the content indicated by the selection. The on-hold party's device then presents the information asset through its user interface or through an acoustic or a haptic device, while the party is on hold. Presenting content from the user's device in this manner allows the user to personalize the information that is provided to the party that she places on hold. Presenting personalized content in such an interactive way may also alleviate the wait time inconvenience of the on-hold party.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention will now be described with reference to the drawings summarized below. The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
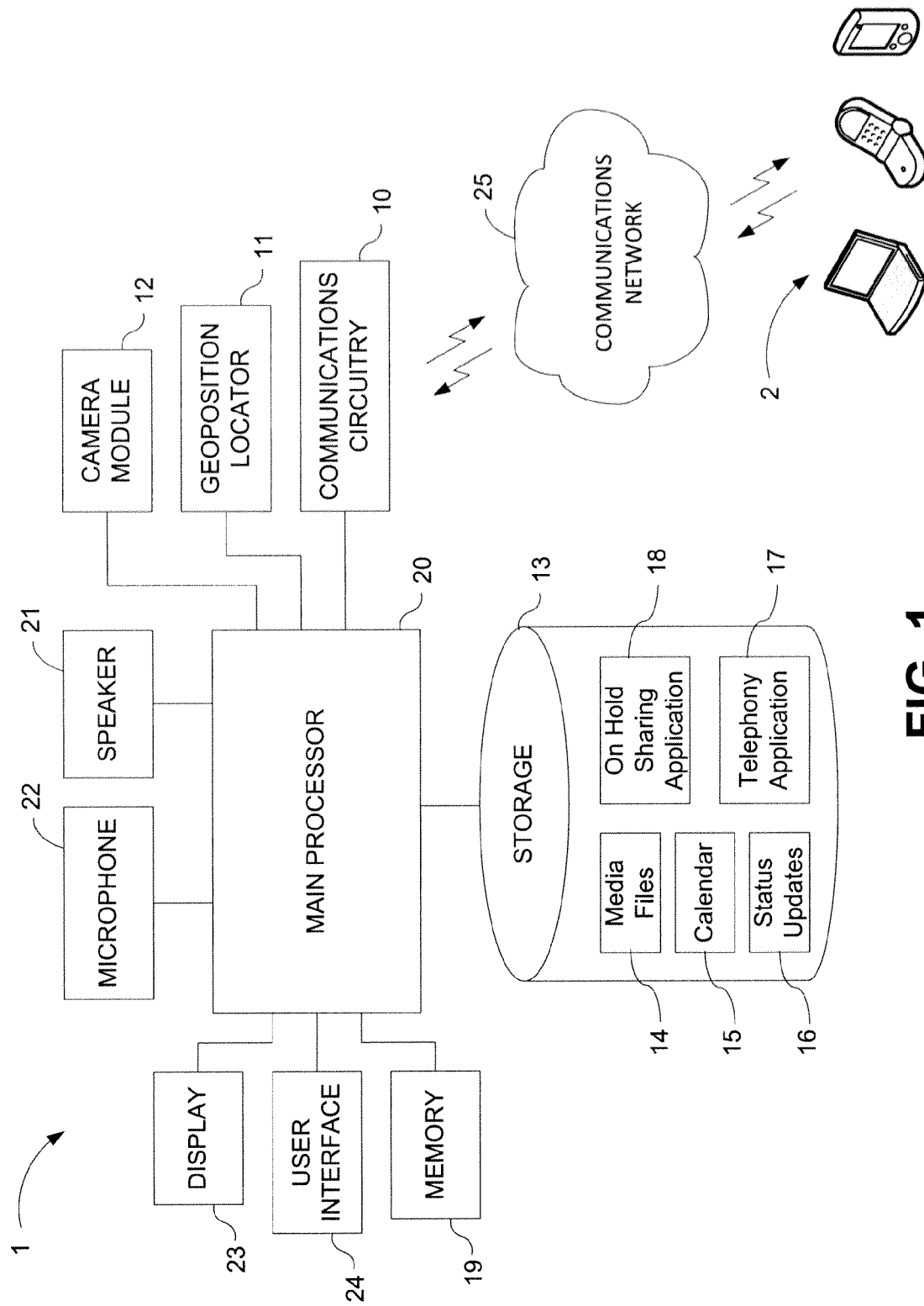
FIG. 1 is a block diagram of some of the hardware components in an example communications device.

FIG. 1 is a block diagram of some of the hardware components in a user-equipment communications device in which an embodiment of the invention may be implemented. The communication device will now be referred to as a mobile device 1, which may be any handheld mobile communications device that supports a two-way voice conversation that may be part of a voice call or a video call, collectively referred to as a call, that has been established between the user of the mobile device 1 and a party of a remote device 2.

Evolving wireless technologies are able to provide greater bandwidth, thereby increasing capacity and allowing for enhanced services. The mobile device 1 may include the capability for a simultaneous data call (also referred to as a packet service call) while a voice call (also referred to as a circuit service call) is in progress. In particular, the mobile device 1 may be a cellular phone, a smart phone, or any other portable wireless device that is capable of supporting a two-way real-time voice call (e.g., circuit service call) simultaneous with a data communications channel (e.g., packet service call). The remote device 2 may be a similar communications device, i.e., one that has the capability of supporting a call for the party to conduct a voice conversation with the user of the mobile device 1, simultaneous with a data channel that lets the remote device 2 receive an on-hold visual menu from the mobile device 1 and then interact with the device 1 through the visual menu.

The mobile device 1 communicates with the remote device 2 through a communications network 25, in accordance with any technology suitable for mobile communications such as General Packet Radio Service (GPRS), Global Systems for Mobile (GSM), Code Division Multiple Access (CDMA), Universal Mobile Telecommunications System (UMTS), Integrated Dispatch Enhanced Network (iDEN), 3G technologies, etc. In some embodiments, the mobile device 1 may also communicate with the remote device 2 through a network composed of several different types of networks that cooperate with each other (e.g., via gateways) to establish and conduct a call. For example, the communications network 25 may include, in addition to the cellular network, traditional telephone lines and circuit switches (Plain Old Telephone System, POTS), voice over wireless local area network or WiFi (e.g., a IEEE 802.11 protocol), high frequency systems (e.g., 900 MHz, 2.4 GHz, and 5.6 GHz communications systems), infrared, other relatively localized wireless communication protocol, or any combination thereof.

The mobile device 1 has a housing (not shown) in which are integrated the components depicted in FIG. 1. The mobile device 1 includes a main processor 20 that may interact with communications circuitry 10, a geoposition locator 11, camera circuitry 12, storage 13, memory 19, a speaker 20, a microphone 22, display 23, and user interface 24. The various components of the mobile device 1 may be digitally interconnected and used or managed by a software stack being executed by the main processor 20. Many of the components shown or described here may be implemented as one or more dedicated hardware units and/or a programmed processor (software being executed by a processor, e.g., the main processor 20).

The main processor 20 controls the overall operation of the device 1 by performing some or all of the operations of one or more applications implemented on the device 1, by executing instructions for it (software code and data) that may be located in the storage 13. The processor 20 may, for example, drive the display 23 and receive user inputs through the user interface 24 (which may be integrated with the display 23 as part of a touch screen on the front face of the mobile device 1). The main processor 20 may also perform the operations of providing the remote device 2 with interactive information, such as a visual on-hold menu, while the user of mobile device 1 has the party of the remote device 2 on hold.

Storage 13 provides a relatively large amount of "permanent" data storage, using nonvolatile solid state memory (e.g., flash storage) and/or a kinetic nonvolatile storage device (e.g., rotating magnetic disk drive). Storage 13 may include both local storage and storage space on a remote server. Storage 13 may store data, such as media files 14 (e.g., images, music, videos, books, periodicals), calendar information 15, status updates 16, and software components that control and manage, at a higher level, the different functions of the mobile device 1. For instance, there may be a telephony application 17 that configures a built-in touch sensitive display to look like the keypad of a traditional telephony handset, and allows the user to enter a telephone number to be called, or select a previously stored number from a telephone address book. The telephony application 17 may register the media device as a cellular handset with the nearest cellular base station (using the appropriate cellular communications protocols built into the mobile device 1). The application then proceeds to allow the user to initiate or answer a call, accesses the built-in microphone 22 and drives the earpiece speaker 21 to enable the user to conduct a two-way conversation during the call, and places the call on hold based on some form of user input. Another application may be an on hold sharing application 18 that would allow the user of the mobile device 1 to select or indicate what information is to be shared with the party that the user places on hold, establish a data channel with the remote device 2, and then use the data channel to provide the selected interactive information to the party, while the party is on hold.

In addition to storage 13, there may be memory 19, also referred to as main memory or program memory, which provides relatively fast access to stored code and data that is being executed by the main processor 20. Memory 19 may include solid state random access memory (RAM), e.g., static RAM or dynamic RAM. There may be one or more processors, e.g., main processor 20, that run or execute various software programs, modules, or sets of instructions (e.g., applications) that, while stored permanently in the storage 13, have been transferred to the memory 19 for execution, to perform the various functions described above. It should be noted that these modules or instructions need not be implemented as separate programs, but rather may be combined or otherwise rearranged in various combinations. In addition, the enablement of certain functions could be distributed amongst two or more modules, and perhaps in combination with certain hardware.

The mobile device 1 may include communications circuitry 10. Communications circuitry 10 may include components that enable the above mentioned call and data channel transfer over a wireless link with a nearby base station. For example, communications circuitry 10 may include RF communications circuitry that is coupled to an antenna, so that the user of the mobile device 1 can place or receive a call through a wireless communications network. The RF communications circuitry may include a RF transceiver and a cellular baseband processor to enable the call through a cellular network. The communications circuitry 10 may also include Wi-Fi communications circuitry which may be used to establish a data channel with the remote device 2. The Wi-Fi circuitry may also be used to conduct the call using a voice over Internet Protocol (VoIP) connection, through a wireless local area network (instead of a cellular network connection).

The mobile device 1 may also include a geoposition locator 11. The geoposition locator 11 enables the mobile device 1 to determine its current geographic position. Such position may be obtained by a global positioning system (GPS). Using a GPS, the mobile device 1 can ascertain its present geographic location (latitude, longitude, and altitude), by the detection and processing of signals from geo-synchronous satellites. The mobile device 1 may use other alternative systems to determine its geographic location, such as line-of-sight, dead reckoning, wireless triangulation, or an equivalent location determination system. The geoposition locator 11 may be used to determine the current geographic location of the mobile device 1. The user of the mobile device 1 may configure the device to share such current location data with the party that the user places on hold.

The mobile device 1 may also include a digital camera module 12 that implements the digital camera functionality of the mobile device 1. The camera module 12 may be used to capture digital still images and/or videos that may be stored in the storage 13 and which may be shared with the party of the remote device 2 while the party is on hold.

Figure 2:
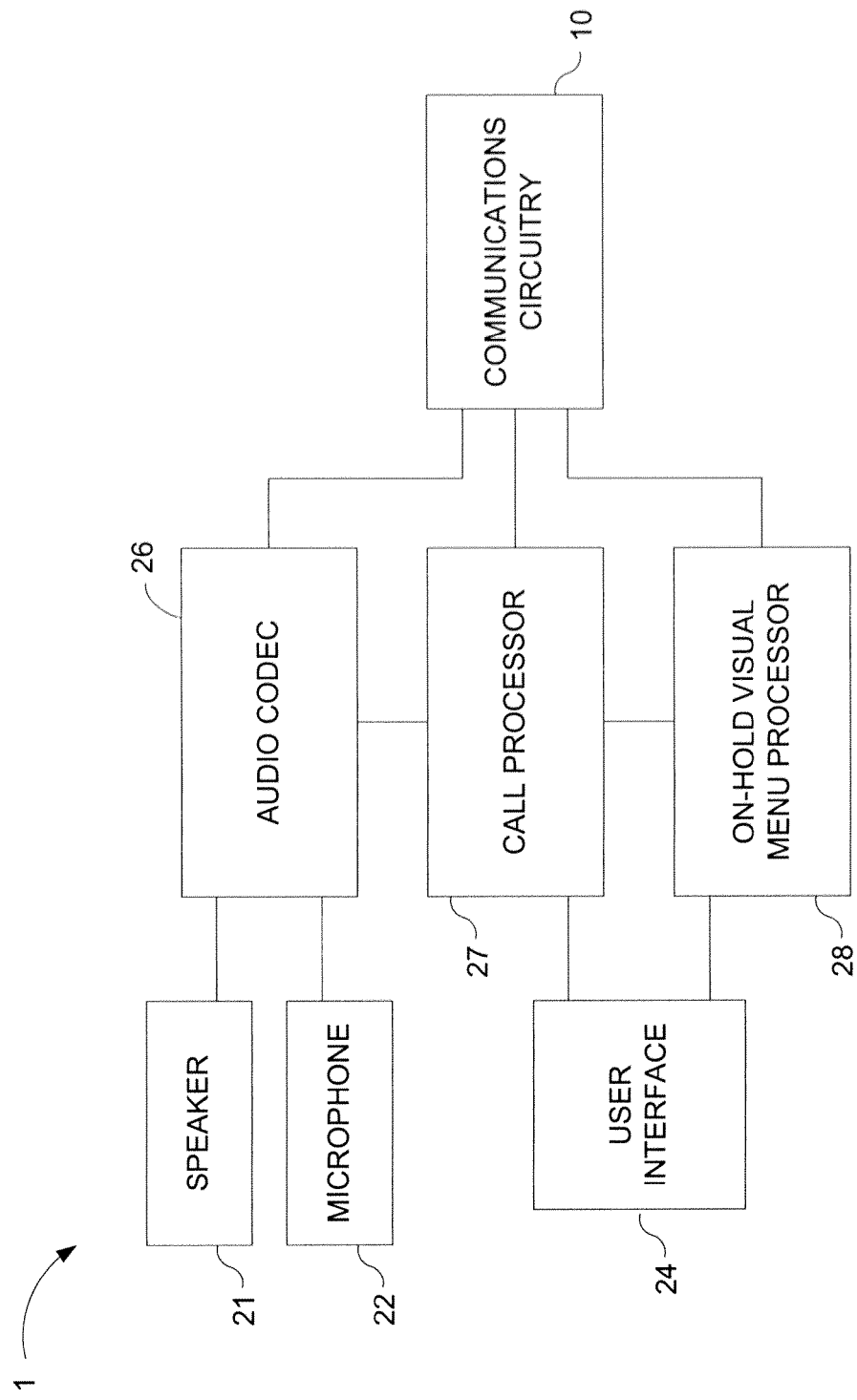
FIG. 2 is a block diagram of some of the hardware functional units that are particularly relevant for providing a visual menu to a communications device of a party that is placed on hold during a call.

FIG. 2 is a block diagram of some of the functional units in the mobile device 1 that may be used for providing a visual menu and other on-hold information to the remote device 2 during a call. In addition to communications circuitry 10, speaker 21, microphone 22, and user interface 24, the device 1 may also include an audio coder-decoder (codec) 26, a call processor 27, and an on-hold visual menu processor 28. The call processor 27 and the on-hold visual menu processor 28 may be implemented as one or more dedicated hardware units and/or a programmed processor (software being executed by a processor, e.g., the main processor 20).

The audio codec 26 acts as an analog/digital interface to the microphone and the speaker, by providing analog amplifiers, other analog signal conditioning circuitry, and analog to digital and digital to analog conversion circuitry that is needed for interfacing the analog acoustic transducer signals with digital audio processing algorithms running in the codec 26 and in the call processor 27.

The call processor 27 may configure a built-in touch sensitive screen (part of the user interface 24) to look like the keypad of a traditional telephony handset, and allow the user to enter a telephone number to be called, or select a previously stored number from a telephone address book. The call processor 27 may register the device 1 as a cellular handset or user equipment, with the nearest cellular base station (using the communications circuitry 10 and the appropriate cellular baseband processing and communications protocols that are built into the device 1). The call processor 27 then proceeds to enable the user to initiate or answer a call. Thereafter, during the call, an uplink audio signal is routed from the microphone 22 to the communications circuitry 10 while downlink audio signal drives the speaker 21 (via audio codec 26) to enable the user to conduct a two-way conversation during the call. The call process can also place the call on hold based on some form of user input.

The on-hold visual menu processor 28 enables the user of the mobile device 1 to select or indicate, via the user interface 24, what information is to be shared with the party that the user places on hold, establish a data channel with the remote device 2 through the communications circuitry 10, and then use the data channel to provide the selected interactive information to the party, while the party is on hold.

Figure 3:
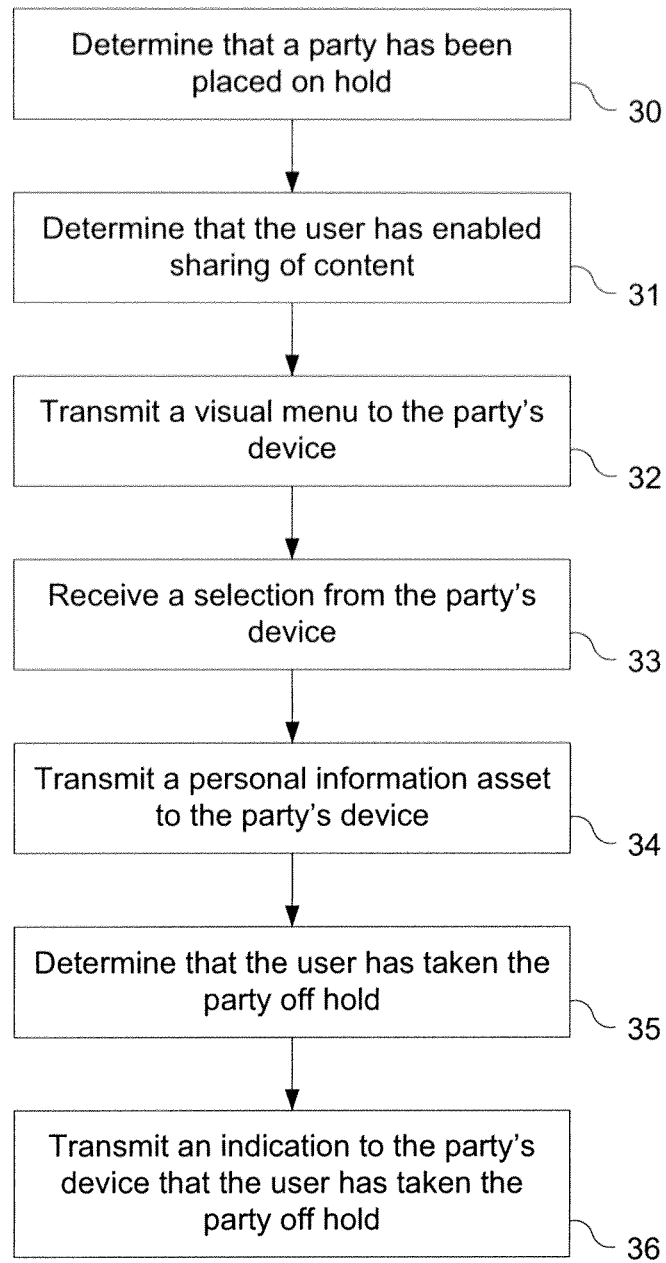
FIG. 3 is a flow chart showing the operations performed by the communications device to provide on-hold content.

FIG. 3 is a flowchart of the operations that are performed by the mobile device 1 in providing personal content over a data network, such as a cellular data network or Wi-Fi, to the party on a call with the user of the mobile device 1, when the user places the party on hold. While the user is on a call with the party, the user and the party may not actually be speaking during the entire duration of the call, and thus the call may be placed on hold. There are many other instances when the user of the mobile device 1 may place a call on hold. For example, the user may place the party of the remote device 2 on hold if a third-party attempts to call the user while the user is participating in an established and on-going call with the party. In another example, the user or the mobile device 1 may answer an incoming call (from the party of the remote device 2) and then place the call on hold, if the user is not immediately available to answer the phone. The term on hold defines the condition when a call between the user of the mobile device 1 and the party of the remote device 2 has been answered but is in a state of temporary interruption. Such an interruption may be initiated automatically by the mobile device 1 or manually its user.

The functionality may begin with the call processor 27 (FIG. 2) determining that the user has placed the party of the remote device 2 on hold (in block 30). This may be performed by monitoring the incoming and outgoing voice signals of the call (downlink and uplink communication signals), for the lack or absence of sound that is indicative of a voice conversation. The call processor 27 can exploit the fact that there may be certain audio sequences which are inherently part of a communications signal during an active conversation. For example, the absence of certain frequencies which are inherently created when an audio signal is generated from a telephone microphone, e.g., speech, may indicate that a party to the call has been placed on hold.

Figure 4:
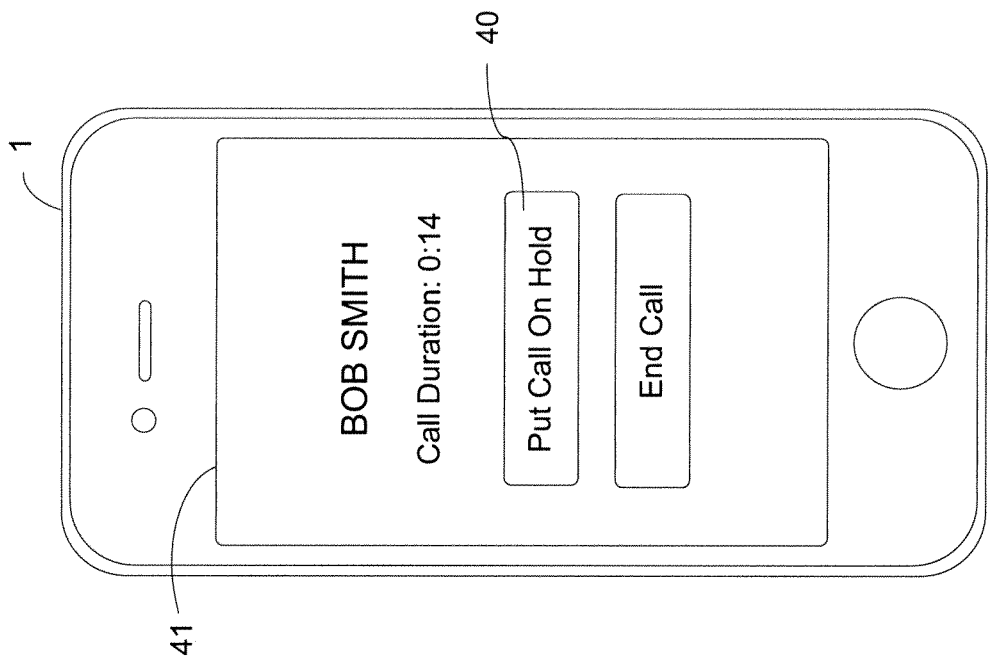
FIG. 4 shows a mobile device whose screen has an example call window being displayed during a call.

In another embodiment, the call processor 27 may determine that the user has placed the party on hold by detecting a user input indicating that the user has placed the party on hold. For example, FIG. 4 shows an example user interface of the mobile device 1 in which the user may select, by touching a virtual button (e.g., "Put Call On Hold" button 40) on the touch sensitive display screen 41, to place the party of the remote device 2 on hold. As an alternative to the virtual button 40 shown in FIG. 4, a physical switch may be provided that when actuated results in the ongoing call (and thus the party of the remote device 2) being placed on hold. Alternatively, the user input may be in the form of a hand gesture detected using a proximity sensor, a tap detected using an accelerometer or gyro sensor, or even a voice command detected by a voice recognition system.

Figure 5:
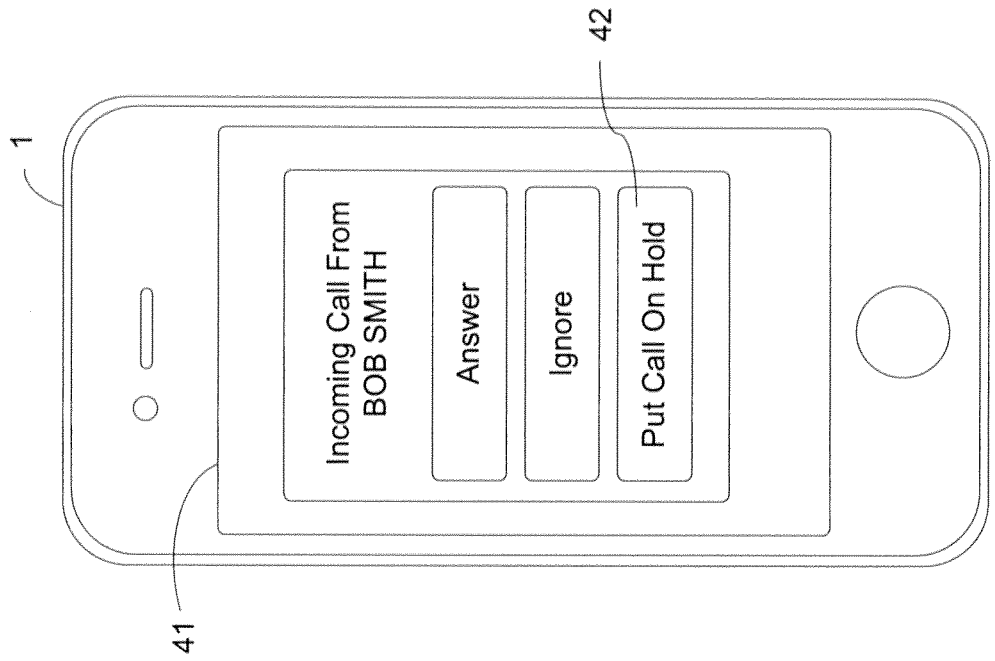
FIG. 5 shows a mobile device whose screen has an example incoming call window being display when receiving an incoming call.

In yet another embodiment, the call processor 27 may determine that the party of the remote device 2 is to be placed on hold, when receiving a request from the remote device 2 to establish a call with the user and determining that the user is not available to immediately answer the incoming call. For example, FIG. 5 shows an example user interface of the mobile device 1 during an incoming call request, in which the user may indicate, by pressing the "Put Call on Hold" button 42 on the touch screen 41, that she is not available to immediately answer the call. In this case, the device 1 will answer the incoming call and then immediately place the call on hold (rather than having the call automatically routed to voicemail). As an alternative to requiring user input during the incoming call request, the call processor may be configured by the user (in advance of the next incoming call request) to automatically answer the next incoming call and immediately place the call on hold, without first routing the downlink audio signal to a speaker of the mobile device 1. This is useful when, for example, the user knows that she is going to be unavailable at a certain time.

In response to determining that the party of the remote device 2 has been placed on hold, the call processor 27 may signal to the on-hold visual menu processor 28 that the call has been placed on hold. Referring again to FIG. 3, prior to providing the interactive content to the remote device 2, the on-hold visual menu processor 28 may determine that the user has enabled sharing of her personal content with the party of the remote device 2 (in block 31). Personal content may include information that is personal to the user of the device 1, as opposed to public or general information. Such personal information may be, for example, still images captured by the user, music that the user has elected to store on the device 1, videos that the user has captured with the device's camera module, status updates that the user has entered into the device 1, upcoming events on the user's calendar, titles of books that the user is currently reading, pre-recorded personal messages that the user has stored on the device 1, and the current location of the user's device 1. The on-hold visual menu processor 28 may determine that the user has enabled sharing of her personal content by detecting that the user has configured the device to share certain personal content.

Figure 6:
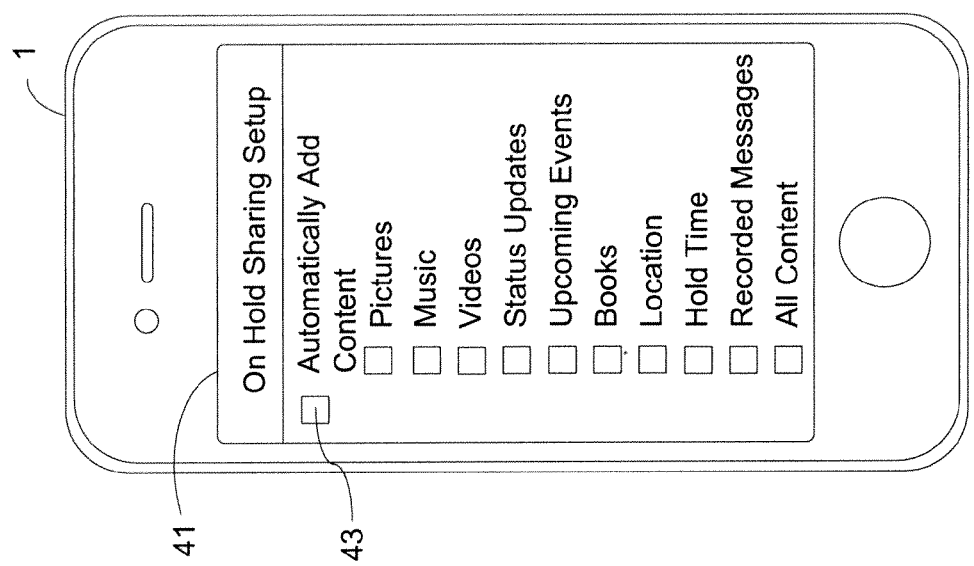
FIG. 6 shows a mobile device whose screen has an example user interface being displayed for selecting categories of on-hold content to provide to an on-hold party.

For example, FIG. 6 shows an example user interface of the mobile device 1 in which the user may configure the mobile device 1 to automatically share certain personal content based on, for example, the recent use of the mobile device 1. Touch screen 41 may display an input, for example, check box 43, in which the user may select to configure the mobile device 1 to automatically add personal content to the information to share with a party that the user places on hold. The type of content may include, for example, pictures, music, videos, status updates, upcoming events on the user's calendar, books, location information, hold time information, pre-recorded personal messages, or any other types of content that may be stored on or determined by the mobile device 1. The user may configure the mobile device 1 to share specific types of content by, for example, selecting the check box that corresponds to the type of content. For example, if the user selects the check box that corresponds to pictures, the most recent images captured by the built-in camera of mobile device 1, e.g., using camera module 12, will be included in the personal content to share with the party of the remote device 2. As another example, the user may select the check box corresponding to music. In this case, the most recently listened to songs that are stored in the user's device 1 may be included in the personal content to share with the party.

Other criteria may be used by the mobile device 1 in automatically selecting personal content to share with the on-hold party. For example, the criteria may be a predetermined number of the most recently accessed items, the most frequently accessed items, the newest items, or the highest rated items in the selected category. In addition, the user may select more than one category of information to share with a party.

Figure 7:
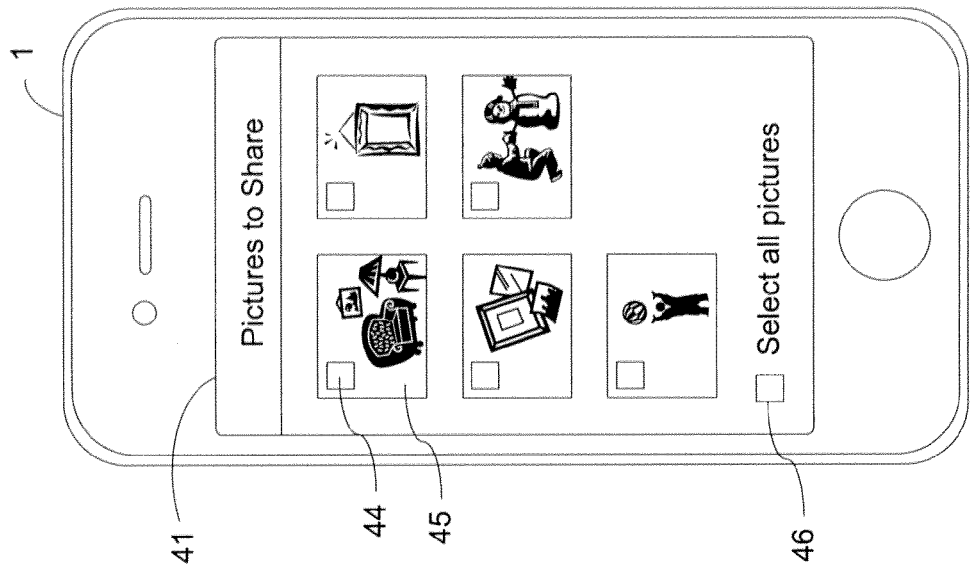
FIG. 7 shows a mobile device whose screen has an example user interface being displayed for selecting images to include as on-hold content.

In another embodiment, the on-hold visual menu processor 28 may determine that the user has enabled sharing of her personal content with the on-hold party, by determining that the user has selected specific personal information assets (also referred to previously as items) to share with a party that the user has placed on hold. For example, FIG. 7 shows an example user interface of the mobile device 1 in which the user may select specific images to share with the party. Touch screen 41 may include an input for each image file stored on the device 1 in which the user may select certain image files to include in the content that is shared with the party. The input may be in the form of a check box, for example, check box 44 corresponding to an image file that is represented by a thumbnail image 45. The user may select more than one image to share by selecting the check boxes for multiple images or by selecting the check box 46 to select all of the pictures that are currently displayed on the touch screen 41. Check box 46 may alternatively be used to select all of the images that are stored on the mobile device 1. Alternatively, the mobile device 1 may prompt the user to indicate whether to include a certain image in the content to share with the party when, for example, the mobile device 1 captures a new image with its imaging sensor or the user saves a new image to the storage (e.g., storage 13) of the mobile device 1. Similar techniques may be used to select specific media files (e.g., music and videos), text files (e.g., books), status messages, pre-recorded personal messages, and calendar events. Other techniques are also possible.

The user may also configure the mobile device 1 to share personal content based on the identity of the on-hold party. For example, the user may configure the mobile device 1 to share personal content with only certain contacts in the user's contact listing. As another example, the user may select a set of personal information assets to share with one party and a different set of personal information assets to share with another party. The user may alternatively select a set of personal information assets to share with the contacts in the user's contact listing and a different set of personal information assets to share with parties that are not in the user's contact listing. The mobile device 1 may store an indication of the selected types of content or items to share, along with the contact's other information that may be stored in the mobile device 1.

After the call processor 27 determines that the user has placed the party on hold and the on-hold visual menu processor 28 has determined that the user has enabled sharing of her personal content, the on-hold visual menu processor 28 may signal to the communications circuitry 10 that a data channel needs to be established for transmitting a visual menu from mobile device 1 to remote device 2. The communications circuitry 10 may respond by establishing a data communications channel to support a data call (i.e., a packet service call) between mobile device 1 and remote device 2. The mobile device 1 may support both the data call (e.g., a packet service call) and the voice call (e.g., a circuit service call) simultaneously. In other words, the mobile device 1 may remain connected with the remote device 2 over the voice communications channel while the mobile device 1 is also connected to the remote device 2 over the data communications channel. During the on-hold interval, the mobile device 1 may transmit silence over the voice communications channel and may not present downlink audio signals received over the voice channel to the user. Alternative to supporting both the data call and the voice call simultaneously, the mobile device 1 may disconnect the voice call after it has connected with the data call. After the on-hold interval ends, the mobile device 1 may reconnect with the voice call and disconnect the data call.

The communications circuitry 10 may establish the data connection to the remote device 2 through a cellular phone network using any technology suitable for data communications such as Enhanced Data rates for GSM Evolution (EDGE), Universal Mobile Telecommunications System (UMTS), 3G and 4G technologies, etc. Alternatively, the communications circuitry 10 may establish the data connection through Wi-Fi (e.g., a IEEE 802.11 protocol) using any technology suitable for data communications through a wireless local area network, such as a hypertext transfer protocol (HTTP), a Session Initiation Protocol (SIP), an International Telecommunications Union (ITU) standard (e.g., H.323 protocol), etc. In the case where the data channel is to be established through Wi-Fi, the mobile device 1 may first request (e.g., from a server of a cellular phone service provider) the internet protocol (IP) address of remote device 2 using an identifier associated with remote device 2, for example, the phone number of remote device 2. After the mobile device 1 receives the IP address of remote device 2, the mobile device 1 may establish the data connection with remote device 2 through Wi-Fi.

Figure 8:
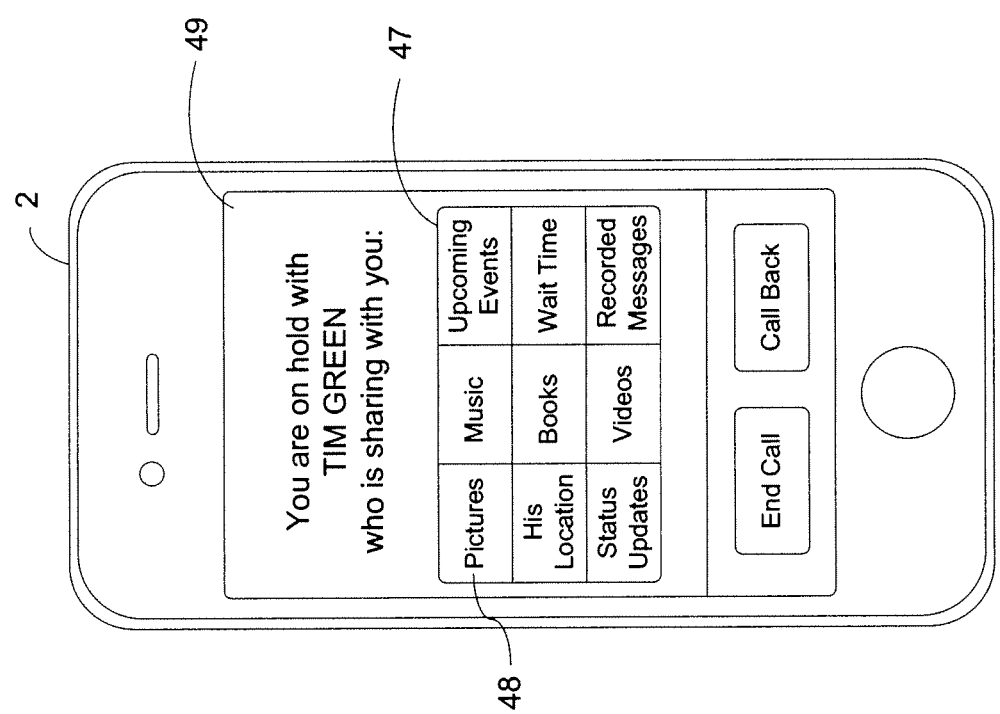
FIG. 8 shows a remote device whose screen has an example on-hold visual menu being displayed during a call, prompting the on-hold party to select content that the other party to the call is willing to share.

Referring again to FIG. 3, after the mobile device 1 establishes the data channel to remote device 2, the on-hold visual menu processor 28 may transmit a visual menu to the remote device 2 of the on-hold party (in block 32). FIG. 8 shows an example visual menu 47 being displayed, that may be transmitted from the mobile device 1 and displayed by the remote device 2. The visual menu 47 may describe the types of personal content that the user of the mobile device 1 is willing to share with the on-hold party. The on-hold party may use the visual menu 47 to select a type of content to receive from the mobile device 1 while the party is on hold. The categories that are included in the visual menu 47 are based upon the type of personal content that the user of the mobile device 1 has selected to share with the party. For example, if the user of the mobile device 1 has enabled sharing of pictures, a pictures category will be included in the visual menu 47 as a category that is selectable by the on-hold party. The party may select the pictures category by, for example, pressing the virtual button 48 that corresponds to the pictures category on the touch screen display 49. The selected category is then sent from the remote device 2 where it is received by the mobile device 1 (in block 33 of FIG. 3).

In one embodiment, the visual menu 47 and subsequent data transferred between device 1 and remote device 2 may be transmitted using, for example, hypertext markup language (HTML) codes via a hypertext transfer protocol (HTTP). Other document markup language and internet networking protocols can be used. The remote device 2 in this case may have an application (having functionality provided by such applications as a web browser, a graphical email client, or an instant messaging application) that can read the HTML code and display the visual menu to the party (according to the code). The visual menu 47 may contain hyperlinks back to the mobile device 1, and are selectable by the remote party. The items in the selected category may also be transmitted from the mobile device 1 to the remote device 2 using HTML via HTTP to be presented to the party.

In another embodiment, the visual menu 47 and subsequent data transferred between device 1 and remote device 2 may be transmitted using a Real-time Transport Protocol (RTP) via a data communications session that is set up using SIP or, alternatively, H.323. In this case, once the IP address of the remote device 2 has been obtained, the mobile device 1 may transmit, for example, an SIP INVITE message to the remote device 2 to set up the session. After the session is set up between the mobile device 1 and the remote device 2, the devices 1 and 2 may communicate with each other using an RTP packet format. The remote device 2 may have an application (e.g., an SIP client or an audio/video capable instant messaging application) that interprets the "Payload Type" field of an incoming RTP packet and presents the visual menu 47 and other on-hold information to the on-hold party in accordance with the type of data that is indicated in the "Payload Type" field. The application in the remote device 2 may also format the "Payload Type" field of an outgoing RTP packet to indicate that the data in the outgoing RTP packet includes a selection of a category that was presented to the remote party via the visual menu 47. The remote device 2 then transmits the RTP packet to the mobile device 1.

Figure 9:
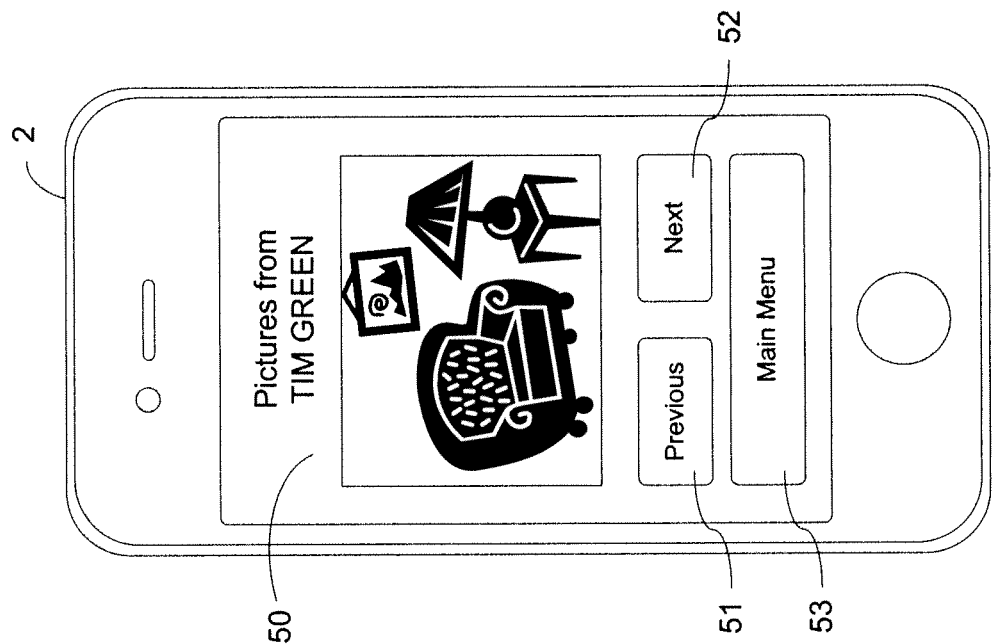
FIG. 9 shows a remote device whose screen has an example user interface being displayed, presenting on-hold content from a selected category.

In response to receiving a selection from the remote device 2, the on-hold visual menu processor 28 of mobile device 1 may transmit a personal information asset to the remote device 2 (in block 34 of FIG. 3). The on-hold visual menu processor 28 may transmit an information asset that is categorized as being of the type of content that was selected by the party using the remote device 2. For example, if the party selected the pictures category from the visual menu 47 (shown in FIG. 8) displayed on the remote device 2, the on-hold visual menu processor 28 may transmit an image file, which the user of the mobile device 1 had previously selected to share with the party, to the remote device 2. FIG. 9 shows an example user interface "document" 50 that may be transmitted by the mobile device 1 to the remote device 2. The user interface document 50 may be transmitted using the same protocol that was used to transmit the visual menu 47. The user interface document 50 may be used to display the image file. If more than one image is available for the party to view, the user interface document 50 may include buttons 51 and 52 through which the party can request a different image from the mobile device 1. The user interface document 50 may also include a button, such as the Main Menu button 53, which the party may press to return to the visual menu 47 where the party may select a different category of information to receive while the party remains on hold. A similar user interface may be used to enable the on-hold party to select and experience information assets from categories other than the pictures category. Other user interfaces and techniques are also possible.

Referring again to FIG. 3, the mobile device 1 may continue to receive input from and transmit information assets to the remote device 2 as described above (via the visual menu 47), until the mobile device 1 determines that the user has taken the party off hold (in block 35). The call processor 27 may determine that the user has taken the party off hold by detecting an input from the user of the mobile device 1. For example, the user may press a button when the user is ready to resume the call. Alternatively, the mobile device 1 may automatically determine that the user has taken the party off hold by, for example, monitoring a voice signal (as discussed above), which can indicate that the user is ready to resume the call. Other techniques and a combination of techniques may be used to determine when the user has taken the party off hold. For example, many of the same techniques for determining when a user has placed the call on hold may be used to determine when a user has taken the call off hold.

In response to determining that the user has taken the call off hold, the call processor 27 may signal to the on-hold visual menu processor 28 that the user has taken the party off hold. The on-hold visual menu processor 28 may then transmit an indication to the remote device 2 that the user has taken the party off hold and is ready to resume the call (in block 36). The indication may instruct the remote device 2 to instantly terminate its presentation of on-hold information to the party and immediately switch to a foreground task that routes downlink voice data for the call to the speaker and uplink voice data (from a microphone) to a call transmitter in the remote device 2. The indication may alternatively instruct the remote device 2 to notify the party that the user desires to resume the call, before switching to the call. Such notification may be, for example, an audio signal (e.g., beep, tone, prerecorded audio), a graphical signal (e.g., text, icon, indicator light), or a tactile signal (e.g., vibration signal).

If the mobile device 1 was simultaneously connected to both the data call and the voice call during the on-hold interval, the mobile device 1 may once again transmit voice data over the voice communications channel and present downlink audio signals received over the voice channel to the user. The mobile device 1 may continue to simultaneously support both the data call and the voice call, or alternatively, the device 1 may disconnect the data call.

If the mobile device 1 disconnected the voice call during the on-hold interval, the call processor 27 may signal to the communications circuitry 10 that the voice call to the remote device 2 needs to be reconnected. In response, the communications circuitry 10 may establish a voice communications channel with the remote device 2. The communications circuitry 10 may then disconnect the data call between the mobile device 1 and the remote device 2, or alternatively, the data call may remain connected during the remainder of the voice call.

Embodiments of the invention may include various operations as set forth above or fewer operations or more operations or operations in an order that is different from the order described. The operations may be represented in machine-executable instructions that cause a general-purpose or special-purpose processor to perform these operations. That is, the techniques may be carried out in a computer system or other data processing system in response to its processor, such as a microprocessor, executing sequences of instructions. Such a computer program may be stored or transmitted in a machine-readable medium. A machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media such as, but not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

Alternatively, these operations may be performed by specific hardware components that contain hardwired logic for performing the operations, or by any combination of programmed computer components and custom hardware components. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize that what is meant by such expressions is that the functions result from execution of code by a processor, such as a microprocessor.

For purposes of explanation, specific embodiments of the invention have been described to provide a thorough understanding of the present invention. These should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation, and details of the systems and methods of the present invention disclosed herein without departing from the spirit and scope of the invention as defined in the appended claims. For instance, the mobile device 1 is depicted in FIG. 4 as having a touch screen as the input interface; however, the mobile device 1 may alternatively, or in addition, have one or more physical buttons and a cursor control mechanism as part of the input interface. Also, while the discussion above refers to the user's communications device as a mobile device 1, an alternative is to implement the call processing, on-hold visual menu provision, and the interactions with the party's remote device, in a "non-mobile" communications device such a networked desktop personal computer in which an internet telephony application program containing the needed software can be run to perform those operations. Therefore, the scope of the invention should be determined by the claims and their legal equivalents. Such equivalents include both currently known equivalents as well as equivalents developed in the future, i.e., any elements developed that perform the same function, regardless of structure. Furthermore, no element, component, or method step is intended to be dedicated to the public regardless of whether the element, component, or method step is explicitly recited in the claims.

What is claimed is:

1. A method in a user equipment communications device, for providing content to a party who is on a call with a user of the user equipment communications device, comprising:
    determining that the party has been placed on hold;
    determining that the user has enabled sharing of personal content;
    transmitting a visual menu to a user equipment communications device of the party via a data network to allow the party to select a type of personal content to receive from the user's communications device while the party is on hold;
    receiving a selection from the party's user equipment communications device via the data network indicating the type of personal content; and
    in response to receiving the selection, transmitting a personal information asset of the user to the party's user equipment communications device via the data network according to the type of personal content indicated by the selection to enable the party's user equipment communications device to present the personal information asset to the party while the party is on hold.

2. The method of claim 1, wherein determining that the party has been placed on hold comprises:
    receiving an input from the user indicating that the user has placed the party on hold.

3. The method of claim 1, wherein determining that the party has been placed on hold comprises:
    identifying the absence of sound that is indicative of a voice conversation.

4. The method of claim 1, wherein determining that the party has been placed on hold comprises:
    receiving a request from the party's user equipment communications device to establish a call with the user; and
    determining that the user is not available to immediately answer the call.

5. The method of claim 1, wherein determining that the user has enabled sharing of personal content with the party comprises:
    receiving an input from the user which explicitly indicates that the personal information asset is to be included in the personal content to share with the party.

6. The method of claim 1, wherein determining that the user has enabled sharing of personal content with the party comprises:
    receiving an input from the user to configure the user's user equipment communications device to automatically include the personal information asset in the personal content to share with the party, wherein the personal information asset is included in the user's shareable personal content based on a criteria that is indicative of the recent use of the user's user equipment communications device.

7. The method of claim 6, wherein the criteria includes at least one of a predetermined number of most recently accessed information assets, a predetermined number of most frequently accessed information assets, a predetermined number of newest information assets, and a predetermined number of highest rated information assets.

8. The method of claim 1, wherein the personal information asset is stored on the user's user equipment communications device and includes at least one of a media file, an image file, a text file, a status message, a calendar event, and a hold time indication.

9. The method of claim 1, wherein the personal information asset is determined by the user's user equipment communications device and includes at least one of a hold time estimate and a current location of the user's user equipment communications device.

10. The method of claim 1, wherein the visual menu indicates a plurality of types of personal content including at least two of music, videos, photos, books, periodicals, status updates, calendar information, hold time information, pre-recorded messages, and location information.

11. The method of claim 1, further comprising:
    receiving a request from the party's user equipment communications device requesting a different personal information asset; and transmitting the different personal information asset to the party's user equipment communications device in response to receiving the request.

12. The method of claim 1, further comprising:
transmitting an indication to the party's user equipment communications device that the user has taken the call off hold.

13. A user equipment communications device, comprising:
processor circuitry to detect that a party to a call has been placed on hold and determine that the user equipment communications device has been configured to share personal content with the party while the party is on hold; and
communications circuitry to transmit a visual menu to a user equipment communications device of the party via a data network during the call, receive a selection from the party's user equipment communications device via the data network indicating a type of personal content selected from the visual menu, and transmit a personal information asset of a user of the user equipment communications device to the party's user equipment communications device via the data network according to the selected type of personal content.

14. The device of claim 13, further comprising:
user interface circuitry to receive an input from the user indicating that the user has placed the party on hold.

15. The device of claim 13, wherein the processor is to detect that the party has been placed on hold by identifying the absence of sound that is indicative of a voice conversation.

16. The device of claim 13, wherein the processor is to detect that the party has been placed on hold by determining that the user is not available to immediately answer the call in response to receiving a request from the party's user equipment communications device to establish a call with the user.

17. The device of claim 13, further comprising:
user interface circuitry to receive an input from the user which explicitly indicates that the personal information asset is to be included in the personal content to share with a party to a call that has been placed on hold.

18. The device of claim 13, further comprising:
user interface circuitry to receive an input from the user to configure the user's user equipment device to automatically include the personal information asset in the personal content to share with the party, wherein the personal information asset is included in the user's shareable personal content based on a criteria that is indicative of the recent use of the user's user equipment communication device.

19. The device of claim 18, wherein the criteria includes at least one of a predetermined number of most recently accessed information assets, a predetermined number of most frequently accessed information assets, a predetermined number of newest information assets, and a predetermined number of highest rated information assets.

20. The device of claim 13, further comprising:
storage circuitry for storing the personal information asset, wherein the personal information asset includes at least one of a media file, an image file, a text file, a status message, a calendar event, and a hold time indication.

21. An article of manufacture, comprising:
a non-transitory machine-readable storage medium having stored therein instructions that program a processor, being a component of a user equipment communications device having data communication capabilities, to detect that a party to a call has been placed on hold, determine that a user has enabled sharing of personal content, cause a transmission of a visual menu to a user equipment communications device of the party via a data network during the call, receive a selection from the party's user equipment communications device via the data network indicating a type of personal content, and cause a transmission of a personal information asset to the party's user equipment communications device via the data network according to the selection received from the party's user equipment communications device.

22. The article of manufacture of claim 21, wherein the machine-readable storage medium contains additional instructions that program the processor to receive an input from the user which explicitly indicates that the personal information asset is to be included in the content to share with the party.

23. The article of manufacture of claim 21, wherein the machine-readable storage medium contains additional instructions that program the processor to receive an input from the user to configure the user's user equipment communications device to automatically include the personal information asset in the content to share with the party, wherein the personal information asset is included in the user's shareable personal content based on a criteria that is indicative of the recent use of the user's user equipment communications device.

24. The article of manufacture of claim 23, wherein the criteria includes at least one of a predetermined number of most recently accessed information assets, a predetermined number of most frequently accessed information assets, a predetermined number of newest information assets, and a predetermined number of highest rated information assets.

25. The article of manufacture of claim 21, wherein the machine-readable storage medium contains additional instructions that program the processor to receive a request from the party's user equipment communications device requesting a different personal information asset and cause a transmission of the different personal information asset to the party's user equipment communications device in response to the request.

26. The article of manufacture of claim 21, wherein the machine-readable storage medium contains additional instructions that program the processor to cause a transmission of an indication to the party's user equipment communications device that the user has taken the call off hold.

* * * * *